United States Patent
Yang et al.

(10) Patent No.: US 11,368,924 B2
(45) Date of Patent: Jun. 21, 2022

(54) DATA TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Ning Yang, Guangdong (CN); Zhi Zhang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 226 days.

(21) Appl. No.: 16/629,901

(22) PCT Filed: Oct. 14, 2017

(86) PCT No.: PCT/CN2017/106228
§ 371 (c)(1),
(2) Date: Jan. 9, 2020

(87) PCT Pub. No.: WO2019/071625
PCT Pub. Date: Apr. 18, 2019

(65) Prior Publication Data
US 2021/0368452 A1    Nov. 25, 2021

(51) Int. Cl.
*H04W 52/26* (2009.01)
*H04L 1/00* (2006.01)
(Continued)

(52) U.S. Cl.
CPC ......... *H04W 52/262* (2013.01); *H04L 1/0003* (2013.01); *H04L 1/0009* (2013.01);
(Continued)

(58) Field of Classification Search
CPC ........... H04W 28/0284; H04W 52/383; H04W 52/262; H04L 1/0003
(Continued)

(56) References Cited

U.S. PATENT DOCUMENTS

| | | | |
|---|---|---|---|
| 2015/0245326 A1* | 8/2015 | Rune | H04L 5/006 370/329 |
| 2016/0020894 A1 | 1/2016 | Tetzlaff et al. | |

(Continued)

FOREIGN PATENT DOCUMENTS

| | | |
|---|---|---|
| CN | 101711058 A | 5/2010 |
| CN | 102271389 A | 12/2011 |

(Continued)

OTHER PUBLICATIONS

Russia Decision of Grant with English Translation for RU Application 2020104069/07(006316) dated Nov. 25, 2020.
(Continued)

*Primary Examiner* — John J Lee
(74) *Attorney, Agent, or Firm* — Young Basile Hanlon & MacFarlane, P.C.

(57) ABSTRACT

Provided are a data transmission method, a terminal device, and a network device. A terminal device determines a first transmission power for uplink data, the first transmission power being less than or equal to a second transmission power, and the second transmission power being a transmission power that is determined by the terminal device according to anti-interference capability of the terminal device; the terminal device determines a first modulation and coding scheme (MCS) of the uplink data according to the first transmission power; and the terminal device sends the uplink data to a network device according to the first MCS.

18 Claims, 3 Drawing Sheets

(51) Int. Cl.
  *H04L 1/08* (2006.01)
  *H04W 52/14* (2009.01)
  *H04W 52/24* (2009.01)
  *H04W 52/36* (2009.01)
(52) U.S. Cl.
  CPC ............. *H04L 1/08* (2013.01); *H04W 52/146* (2013.01); *H04W 52/242* (2013.01); *H04W 52/243* (2013.01); *H04W 52/367* (2013.01)
(58) Field of Classification Search
  USPC ......... 455/522, 69, 66.1, 67.13, 501, 452, 1, 455/509
  See application file for complete search history.

(56) References Cited

U.S. PATENT DOCUMENTS

| | | | |
|---|---|---|---|
| 2017/0034845 A1* | 2/2017 | Liu | H04W 28/0289 |
| 2017/0188391 A1* | 6/2017 | Rajagopal | H04W 28/0284 |
| 2020/0336988 A1* | 10/2020 | Yang | H04J 3/1694 |

FOREIGN PATENT DOCUMENTS

| | | |
|---|---|---|
| CN | 104333899 A | 2/2015 |
| EP | 3648530 A1 | 5/2020 |
| RU | 2629430 C2 | 8/2017 |
| WO | 2012095683 A1 | 7/2012 |
| WO | 2014070049 A1 | 5/2014 |

OTHER PUBLICATIONS

3GPP TSG-RAN WG2 NR Adhoc #2; Qingdao, China, Jun. 27-29, 2017; R2-1706596.
Extended European Search Report for EP Application 17928273.6 dated Jun. 22, 2020.
Communication pursuant to Article 94(3) EPC for EP Application 17928273.6 dated Oct. 28, 2021. (7 pages).
Indian Examination Report for IN Application 202017000962 dated May 20, 2021. (6 pages).

\* cited by examiner

DATA TRANSMISSION METHOD, TERMINAL DEVICE, AND NETWORK DEVICE

CROSS-REFERENCE TO RELATED APPLICATION(S)

This application is a 371 application of International Application No. PCT/CN2017/106228, filed on Oct. 14, 2017, the entire disclosure of which is hereby incorporated by reference.

TECHNICAL FIELD

Implementations of the present disclosure relate to the field of communication, and more particularly, to a data transmission method, a terminal device and a network device.

BACKGROUND

With people's pursuit of speed, delay, high-speed mobility and energy efficiency, and diversity and complexity of services in future life, the 3rd Generation Partnership Project (3GPP) International Standards Organization began to research and develop the 5th Generation (5G) mobile communication technology. Main application scenarios of 5G are: Enhanced Mobile Broadband (eMBB), Ultra-Reliable and Low Latency Communication (URLLC), and massive Machine Type Communication (mMTC).

In early deployment of New Radio (NR), a full NR coverage is difficult to obtain, so a typical network coverage is a mode of Long Term Evolution (LTE) coverage over a wide area and an island coverage of NR. Moreover, as a large amount of LTE is deployed below 6 GHz, few spectrums below 6 GHz may be used for 5G. Therefore, a spectrum application above 6 GHz must be studied in the NR, while in a high frequency band, the coverage is limited, and the signal fading is fast. In the prior art, a working mode of tight interworking between the LTE and the NR is proposed so as to protect investments in the LTE of mobile operators. Specifically, LTE-NR Dual Connection (DC) data transmission is supported by a band combination to improve system throughput.

However, when a terminal device simultaneously works on two or more carriers in different frequency bands, uplink signals of these carriers may interfere with received downlink signals of some carriers, thus reducing a success rate of data transmission.

SUMMARY

A data transmission method, a terminal device and a network device are provided.

In a first aspect, a data transmission method is provided. The method includes: determining, by a terminal device, a first transmission power of uplink data, wherein the first transmission power is less than or equal to a second transmission power, and the second transmission power is a transmission power determined by the terminal device according to anti-interference capability of the terminal device; determining, by the terminal device, a first modulation and coding scheme (MCS) of the uplink data according to the first transmission power; and sending, by the terminal device, the uplink data to a network device according to the first MCS.

In some possible implementations, before the terminal device determines the first transmission power of the uplink data, the method further includes: determining, by the terminal device, a third transmission power according to path loss information of the uplink data and/or power control information sent by the network device and/or scheduling information sent by the network device, wherein the power control information is used for indicating an adjustment amount of current uplink power of the terminal device; wherein determining, by the terminal device, the first transmission power of the uplink data, includes: determining, by the terminal device, the first transmission power by comparing the second transmission power with the third transmission power.

In some possible implementations, determining, by the terminal device, the first transmission power by comparing the second transmission power with the third transmission power, includes: determining, by the terminal device, the third transmission power as the first transmission power when the third transmission power is less than or equal to the second transmission power; or determining, by the terminal device, the second transmission power as the first transmission power when the third transmission power is greater than the second transmission power.

In some possible implementations, before the terminal device determines the first MCS of the uplink data according to the first transmission power, the method further includes: receiving, by the terminal device, the scheduling information sent by the network device, wherein the scheduling information includes configuration information of at least one demodulation reference signal (DMRS) and at least one MCS, and the at least one DMRS is used for indicating a value of at least one uplink power matched with the at least one MCS; wherein determining, by the terminal device, the first MCS of the uplink data according to the first transmission power, includes: determining, by the terminal device, the first MCS according to the scheduling information and the first transmission power.

In some possible implementations, the configuration information of the DMRS includes at least one of: configuration information of cyclic shift, configuration information of comb, and coding information.

In some possible implementations, the scheduling information includes configuration information of a third DMRS and a third MCS, and the third DMRS is used for indicating that a transmission power matched with the third MCS is the third transmission power.

In some possible implementations, determining, by the terminal device, the first MCS according to the scheduling information and the first transmission power, includes: when the first transmission power is the third transmission power, determining, by the terminal device, the third MCS as the first MCS; or when the first transmission power is the second transmission power, determining, by the terminal device, a second MCS is as the first MCS, wherein an order of the second MCS is lower than an order of the third MCS.

In some possible implementations, the scheduling information further includes configuration information of a second DMRS and the second MCS, and the second DMRS is used for indicating that a transmission power matched with the second MCS is the second transmission power.

In some possible implementations, the first MCS is determined by the terminal device through a preconfigured relationship between the second MCS and the third MCS.

In some possible implementations, the method further includes: sending, by the terminal device, a preconfigured DMRS to the network device, wherein the preconfigured DMRS is used for notifying the network device that a transmission power used for the uplink data is the second transmission power.

In some possible implementations, the method further includes: receiving, by the terminal device, indication information sent by the network device, wherein the indication information is used for indicating the terminal device to repeatedly send the uplink data through multiple redundancy versions.

In some possible implementations, receiving, by the terminal device, the indication information sent by the network device, includes: receiving, by the terminal device, downlink control information sent by the network device, wherein the downlink control information includes the indication information.

In a second aspect, a data transmission method is provided. The method includes: receiving, by a network device, uplink data sent by a terminal device; and determining, by the network device, a transmission mode of the uplink data, wherein transmission modes include a first mode and a second mode, the first mode refers to a mode in which the terminal device sends the uplink data according to a third transmission power, the second mode refers to a mode in which the terminal device sends the uplink data according to a second transmission power, the third transmission power is a transmission power controlled by the network device, and the second transmission power is a transmission power determined by the terminal device according to anti-interference capability of the terminal device.

In some possible implementations, before the network device determines the transmission mode of the uplink data, the method further includes: sending, by the network device, scheduling information to the terminal device, wherein the scheduling information includes configuration information of a third demodulation reference signal (DMRS) and a third modulation and coding scheme (MCS), and the third DMRS is used for indicating that a transmission power matched with the third MCS is the third transmission power; wherein determining, by the network device, the transmission mode of the uplink data includes: determining, by the network device, a second MCS according to the third MCS and a preconfigured relationship between the second MCS and the third MCS; demodulating, by the network device, the uplink data by using the third MCS and the second MCS; determining, by the network device, that the transmission mode is the first mode when the network device successfully demodulates the data according to the third MCS, or determining, by the network device, that the transmission mode is the second mode when the network device successfully demodulates the data according to the second MCS.

In some possible implementations, the method further includes: determining, by the network device, a first MCS of the uplink data according to the transmission mode; and demodulating, by the network device, the uplink data according to the first MCS.

In some possible implementations, before the network device determines the transmission mode of the uplink data, the method further includes: sending, by the network device, scheduling information to the terminal device, wherein the scheduling information includes configuration information of at least one demodulation reference signal (DMRS) and at least one MCS, and the at least one DMRS is used for indicating a value of at least one uplink power matched with the at least one MCS; and determining, by the network device, a first DMRS of the uplink data; wherein determining, by the network device, the transmission mode of the uplink data includes: determining, by the network device, the transmission mode according to the first DMRS.

In some possible implementations, the configuration information of the DMRS includes at least one of: configuration information of cyclic shift, configuration information of comb, and coding information.

In some possible implementations, the scheduling information includes configuration information of a third DMRS and a third MCS, and the third DMRS is used for indicating that a transmission power matched with the third MCS is the third transmission power.

In some possible implementations, the scheduling information further includes configuration information of a second DMRS and a second MCS, and the second DMRS is used for indicating that a transmission power matched with the second MCS is the second transmission power.

In some possible implementations, determining, by the network device, the transmission mode of the uplink data includes: determining, by the network device, that the transmission mode is the first mode when the network device determines that the first DMRS is the third DMRS; or determining, by the network device, that the transmission mode is the second mode when the network device determines that the first DMRS is the second DMRS.

In some possible implementations, determining, by the terminal device, the first MCS of the uplink data according to the transmission mode includes: determining the third MCS as the first MCS when the network device determines that the transmission mode is the first mode; or determining the second MCS as the first MCS when the network device determines that the transmission mode is the second mode.

In some possible implementations, the first DMRS is a preconfigured DMRS, and the preconfigured DMRS is used for notifying the network device that a transmission power used for the uplink data is the second transmission power; wherein determining, by the network device, the transmission mode of the uplink data includes: determining, by the network device, that the transmission mode is the second mode.

In some possible implementations, the first MCS is determined by the network device through a preconfigured relationship between the first MCS and the third MCS.

In some possible implementations, the method further includes: generating, by the network device, indication information when the network device determines that the transmission mode is the second mode, wherein the indication information is used for indicating the terminal device to repeatedly send the uplink data through multiple redundancy versions; and sending, by the network device, the indication information to the terminal device.

In some possible implementations, sending, by the network device, the indication information to the terminal device, includes: sending, by the network device, downlink control information to the terminal device, wherein the downlink control information includes the indication information.

In a third aspect, a terminal device is provided, including a processing unit and a transceiving unit.

The processing unit is configured to determine a first transmission power of uplink data, wherein the first transmission power is less than or equal to a second transmission power, and the second transmission power is a transmission power determined by the terminal device according to anti-interference capability of the terminal device; and determine a first modulation and coding scheme (MCS) of the uplink data according to the first transmission power.

The transceiving unit is configured to send the uplink data to a network device according to the first MCS.

In a fourth aspect, a terminal device is provided, including a processor and a transceiver.

The processor is configured to determine a first transmission power of uplink data, wherein the first transmission power is less than or equal to a second transmission power, and the second transmission power is a transmission power determined by the terminal device according to anti-interference capability of the terminal device; and determine a first modulation and coding scheme (MCS) of the uplink data according to the first transmission power.

The transceiver is configured to send the uplink data to a network device according to the first MCS.

In a fifth aspect, a network device is provided, including a processing unit and a transceiving unit.

The transceiving unit is configured to receive uplink data sent by a terminal device.

The processing unit is configured to determine a transmission mode of the uplink data, wherein transmission modes include a first mode and a second mode, the first mode refers to a mode in which the terminal device sends the uplink data according to a third transmission power, the second mode refers to a mode in which the terminal device sends the uplink data according to a second transmission power, the third transmission power is a transmission power controlled by the network device, and the second transmission power is a transmission power determined by the terminal device according to anti-interference capability of the terminal device. The processing unit is further configured to determine a first modulation and coding scheme (MCS) of the uplink data according to the transmission mode and demodulate the uplink data according to the first MCS.

In a sixth aspect, a network device is provided, including a processor and a transceiver.

The transceiver is configured to receive uplink data sent by a terminal device.

The processor is configured to determine a transmission mode of the uplink data, wherein transmission modes include a first mode and a second mode, the first mode refers to a mode in which the terminal device sends the uplink data according to a third transmission power, the second mode refers to a mode in which the terminal device sends the uplink data according to a second transmission power, the third transmission power is a transmission power controlled by the network device, and the second transmission power is a transmission power determined by the terminal device according to anti-interference capability of the terminal device. The processor is further configured to determine a first modulation and coding scheme (MCS) of the uplink data according to the transmission mode and demodulate the uplink data according to the first MCS.

In a seventh aspect, a computer readable medium is provided for storing a computer program. The computer program includes instructions used for executing the method implementations of the above first aspect or the second aspect.

In an eighth aspect, a computer chip is provided, including an input interface, an output interface, at least one processor, and a memory. The processor is configured to execute codes in the memory. When the codes are executed, the processor may implement various processes executed by a terminal device in the data transmission method of the first aspect and various implementations thereof.

In a ninth aspect, a computer chip is provided, including an input interface, an output interface, at least one processor, and a memory. The processor is configured to execute codes in the memory. When the codes are executed, the processor may implement various processes executed by a network device in the data transmission method of the second aspect and various implementations thereof.

In a tenth aspect, a communication system is provided, including the above network device and the above terminal device.

DETAILED DESCRIPTION

Figure 1:
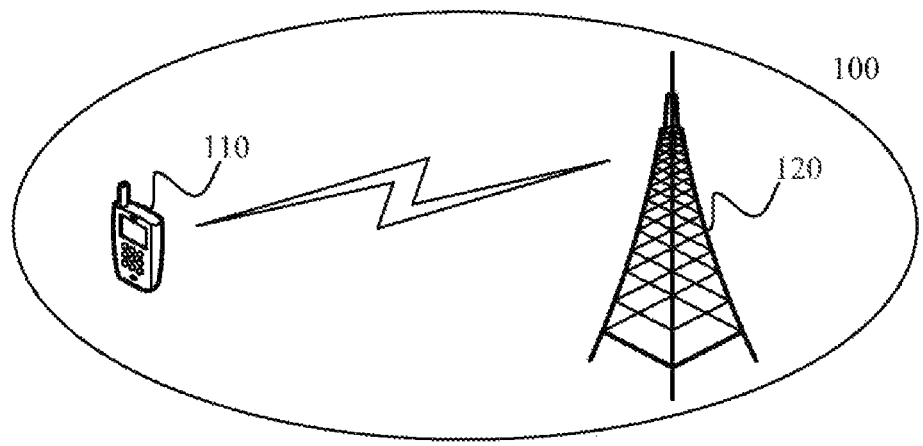
FIG. 1 is an example of a communication system according to an implementation of the present disclosure.

FIG. 1 is a schematic diagram of an application scenario according to an implementation of the present disclosure.

As shown in FIG. 1, a communication system 100 may include a terminal device 110 and a network device 120. The network device 120 may communicate with the terminal device 110 through an air interface. Multi-service transmission is supported between the terminal device 110 and the network device 120.

It should be understood that the communication system 100 is only an example for describing implementations of the present disclosure. However, the implementations of the present disclosure are not limited to this. In other words, technical solutions of the implementations of the present disclosure may be applied to various communication systems, such as, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Time Division Duplex (TDD) system, a Universal Mobile Telecommunication System (UMTS).

Moreover, the present disclosure describes various implementations in connection with a network device and a terminal device.

The network device 120 may refer to any entity on a network side for sending or receiving signals. For example, it may be a user equipment of Machine Type Communication (MTC), a Base Transceiver Station (BTS) in GSM or CDMA, a NodeB in WCDMA, an Evolution Node B (eNB or eNodeB) in LTE, a base station device in a 5G network, etc.

The terminal device 110 may be any terminal device. Specifically, the terminal device 110 may communicate with one or more core networks through a radio access network (RAN), and may also be referred to as an access terminal, a User Equipment (UE), a subscriber unit, a subscriber station, a mobile station, a rover station, a remote station, a remote terminal, a mobile device, a user terminal, a terminal, a wireless communication device, a user agent, or a user device. For example, the terminal device may be a cellular phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, an onboard device, a wearable device, a terminal device in a 5G network or the like.

For the 5G communication system, in the early deployment of the New Radio (NR), a full NR coverage is difficult to obtain, so a typical network coverage is a mode of a Long Term Evolution (LTE) coverage over a wide area and an island coverage of the NR. Moreover, as a large amount of LTE is deployed below 6 GHz, few spectrums below 6 GHz can be used for 5G.

In order to solve the above problem, in the implementations of the present disclosure, LTE-NR Dual Connection (DC) data transmission may be supported by a band combination to improve system throughput. However, when a terminal device simultaneously works on two or more carriers in different frequency bands, uplink signals of these carriers may interfere with received downlink signals of some carriers, thus reducing the success rate of data transmission.

For example, assuming that a carrier F1 operates in a low frequency band and a carrier F2 operates in a high frequency band, following three different types of mutual interference may occur.

The first type of mutual interference is that: the carrier F1 and the carrier F2 are both uplink carriers, and a frequency of a certain order intermodulation (IM) signal of the carrier F1 and carrier F2 overlaps or partially overlaps a frequency of a downlink signal of a certain carrier F3. The carriers F1 and F2 interfere with the carrier F3. Here the carrier F3 may be one of the carriers F1 and F2, or another carrier different from the carrier F1/F2 (in this case, the terminal may operate on more than two carriers simultaneously). For example, the terminal device is configured with LTE carriers of Band 1 and Band 7 and NR carrier (3400-3800 MHz) simultaneously, if UL of Band 7 and UL of the NR are transmitted simultaneously, this generates the 5th order intermodulation effect which will affect the sensitivity of a downlink (DL) receiver of Band 1.

The second type of mutual interference is that: the carrier F1 is an uplink carrier, the carrier F2 is a downlink carrier, and the frequency multiplication of the carrier F1 overlaps or partially overlaps the frequency of the carrier F2. The carrier F1 constitutes harmonic interference to the carrier F2. For example, LTE Band 3 has a bandwidth of 1710-1785 MHz, and its second order harmonic is in a range of 3420-3570 MHz. If a terminal simultaneously performs LTE uplink transmission on Band 3 and DL reception on the NR band of 3400-3800 MHz, the second order harmonic may interfere with the sensitivity of the DL receiver of the NR.

The third type of mutual interference is that: the carrier F1 is a downlink carrier, the carrier F2 is an uplink carrier, and the frequency multiplication of the carrier F1 overlaps or partially overlaps the frequency of the carrier F2. The carrier F2 constitutes harmonic mixing interference to the carrier F1. For example, the downlink of LTE Band 3 is 1805-1880 MHz, and its second order harmonic is in a range of 3610-3760 MHz. If a terminal simultaneously performs LTE downlink reception on Band 3 and uplink transmission on the NR frequency band of 3400-3800 MHz, the second order harmonic intermodulation of the NR may interfere with the sensitivity of the DL receiver of the LTE.

However, the estimation of the severity of the self-interference problem (MSD) is based on the assumption of 23 dbm (the maximum transmission power of the terminal). When the terminal device does not operate at the maximum transmission power, the corresponding self-interference will be correspondingly reduced (under the assumption that the bandwidth is the same), so reducing the transmission power of the interfering side can alleviate the interference degree to a certain extent.

Therefore, an implementation of the present disclosure provides a data transmission method, which can effectively improve the success rate of data transmission by controlling the uplink transmission power of the terminal device.

Figure 2:
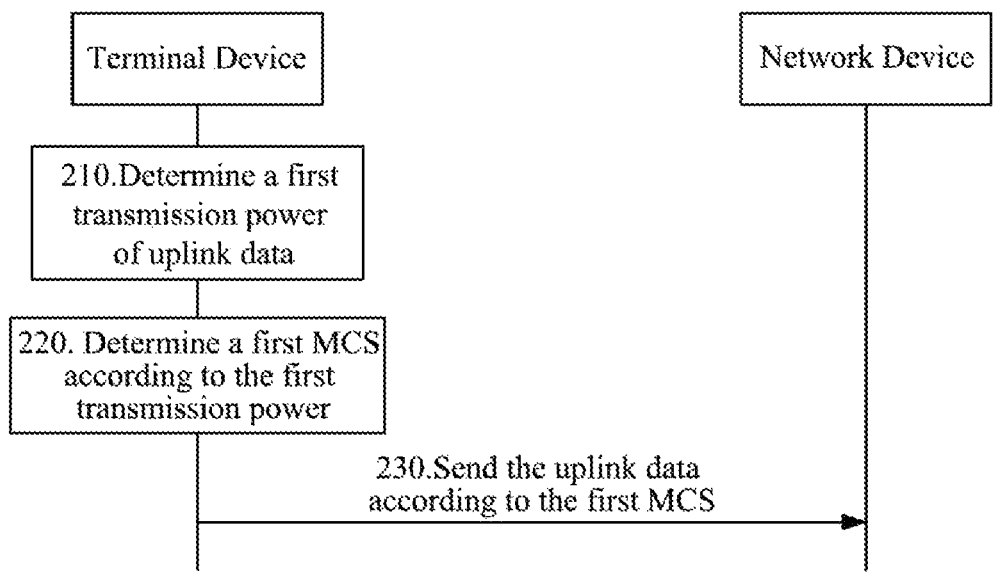
FIG. 2 is a schematic flowchart of a data transmission method according to an implementation of the present disclosure.

FIG. 2 is a schematic flowchart of a data transmission method according to an implementation of the present disclosure.

As shown in FIG. 2, the method includes acts 210-230.

In 210, a terminal device determines a first transmission power of uplink data.

In 220, the terminal device determines a first modulation and coding scheme (MCS) according to the first transmission power.

In 230, the terminal device sends the uplink data according to the first MCS.

Specifically, the terminal device determines the first transmission power for the uplink data, the first transmission power is less than or equal to a second transmission power, and the second transmission power is a transmission power determined by the terminal device according to anti-interference capability of the terminal device, the terminal device determines the first MCS of the uplink data according to the first transmission power, and sends the uplink data to a network device according to the first MCS.

In other words, a network device receives uplink data sent by a terminal device. The network device determines a transmission mode of the uplink data, wherein transmission modes include a first mode and a second mode, the first mode refers to a mode in which the terminal device sends the uplink data according to a third transmission power, the second mode refers to a mode in which the terminal device sends the uplink data according to a second transmission power, the third transmission power is a transmission power controlled by the network device, and the second transmission power is a transmission power determined by the terminal device according to anti-interference capability of the terminal device. Therefore, the network device can determine whether to indicate the terminal device to send the uplink data with various redundancy versions according to the transmission mode of the uplink data, thereby improving the reliability of the data.

It can be seen that multiple transmission powers are involved in the implementations of the present disclosure. For convenience of understanding, the transmission powers involved in the implementations of the present disclosure will be described below.

First transmission power: a transmission power used for transmitting the uplink data and determined by the terminal device. That is, the first transmission power is a transmission power that needs to be determined before the terminal device sends the uplink data.

Second transmission power: any transmission power less than a maximum transmission power that the terminal device can support. Optionally, the terminal device may determine a limited maximum transmission power (i.e., a second transmission power) according to the anti-interference capability of the terminal device, and the limited maximum transmission power is less than the maximum transmission power that the terminal device can support. It should be understood that the anti-interference capability of the terminal device may be a transmission power determined by the terminal device according to an internal interference level of the terminal device. In other words, the terminal device sends the uplink data below the limited maximum transmission power, and the interference level to a receiving end can be reduced to a level that is tolerable by the receiving end. In other words, when the terminal device simultaneously sends and receives data, the transmission power should be below the limited maximum transmission power, thus ensuring that the terminal device can correctly demodulate the received data.

In the implementations of the present disclosure, the terminal device may determine the first transmission power according to the second transmission power and the third transmission power.

The terminal device may determine the third transmission power according to path loss information of the uplink data and/or power control information sent by the network device and/or scheduling information sent by the network device. The power control information is used for indicating an adjustment amount of current uplink power of the terminal device. Furthermore, the terminal device determines the first transmission power by comparing the second transmission power with the third transmission power.

For example, the terminal device determines the third transmission power as the first transmission power when the third transmission power is less than or equal to the second transmission power, or the terminal device determines the second transmission power as the first transmission power when the third transmission power is greater than the second transmission power.

Since the transmission power of the uplink data needs to be kept below the first transmission power when the terminal device sends the uplink data, the terminal device may use an MCS that is not included in the scheduling information.

It should be understood that the network device in the implementations of the present disclosure may firstly determine the first MCS and then determine the transmission mode of the uplink data, or may firstly determine the transmission mode of the uplink data and then determine the first MCS used for demodulating the data.

For example, in an implementation, before the network device determines the transmission mode of the uplink data, the network device may send scheduling information to the terminal device. The scheduling information includes configuration information of a third DMRS and a third MCS, and the third DMRS is used for indicating that a transmission power matched with the third MCS is the third transmission power. Determining, by the network device, the transmission mode of the uplink data includes: the network device determines a second MCS according to the third MCS and a preconfigured relationship between the second MCS and the third MCS, demodulates the uplink data by using the third MCS and the second MCS, and determines that the transmission mode is the first mode when the network device successfully demodulates the data according to the third MCS, or determines that the transmission mode is the second mode when the network device successfully demodulates the data according to the second MCS.

For another example, in another implementation, the network device may determine the first MCS of the network device according to the transmission mode, and the network device demodulates the uplink data according to the first MCS.

Implementation of the network device determining the first MCS of the network device according to the transmission mode in the implementations of the present disclosure will be illustrated in following as an example.

In an implementation, before the terminal device determines the first MCS of the uplink data according to the first transmission power, the method further includes: the terminal device receives scheduling information sent by the network device, wherein the scheduling information includes configuration information of at least one demodulation reference signal (DMRS) and at least one MCS, and the at least one DMRS is used for indicating a value of at least one uplink power matched with the at least one MCS; and the terminal device determines the first MCS according to the scheduling information and the first transmission power. Thus, the network device can determine the first DMRS of the uplink data, and the network device determines the transmission mode according to the first DMRS. Then the first MCS is determined.

Optionally, the configuration information of the DMRS includes at least one of: configuration information of cyclic shift, configuration information of comb, and coding information.

For example, the scheduling information includes configuration information of a third DMRS and a third MCS, and the third DMRS is used for indicating that a transmission power matched with the third MCS is the third transmission power.

Specifically, the terminal device determines the first MCS according to the scheduling information and the first transmission power. The terminal device determines the third MCS as the first MCS when the first transmission power is the third transmission power, or the terminal device determines a second MCS as the first MCS when the first transmission power is the second transmission power, where an order of the second MCS is lower than that of the third MCS.

For another example, the scheduling information further includes configuration information of a second DMRS and the second MCS, and the second DMRS is used for indicating that a transmission power matched with the second MCS is the second transmission power.

Furthermore, the network device may determine that the transmission mode is the first mode when determining that the first DMRS is the third DMRS, or the network device may determine that the transmission mode is the second mode when determining that the first DMRS is the second DMRS. Finally, the network device determines the first MCS of the uplink data. Specifically, the network device determines the third MCS as the first MCS when determining that the transmission mode is the first mode, or the network device determines the second MCS as the first MCS when determining that the transmission mode is the second mode.

For another example, the first MCS is determined by the terminal device through a preconfigured relationship between the second MCS and the third MCS. It should be understood that, since the first MCS is determined by the terminal device through the preconfigured relationship between the second MCS and the third MCS, the terminal device may further sends a preconfigured DMRS to the network device. The preconfigured DMRS is used for notifying the network device that a transmission power used for the uplink data is the second transmission power. Thus, the network device determines that the transmission mode is the second mode, and determines the first MCS through a preconfigured relationship between the first MCS and the third MCS.

In the implementations of the present disclosure, the network device can obtain the transmission power of the uplink data and indicate the terminal device to repeatedly send the uplink data, which further improves the reliability of data transmission.

Figure 3:
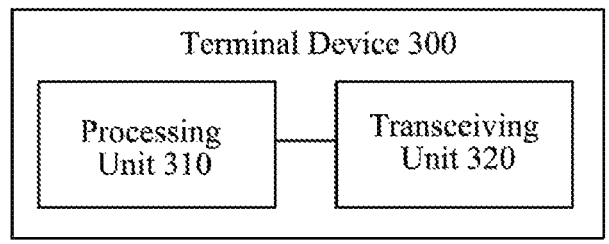
FIG. 3 is a schematic block diagram of a terminal device according to an implementation of the present disclosure.

FIG. 3 is a schematic block diagram of a terminal device 300 according to an implementation of the present disclosure.

As shown in FIG. 3, the terminal device 300 includes a processing unit 310 and a transceiving unit 320.

The processing unit 310 is configured to determine a first transmission power of uplink data and determine a first modulation and coding scheme (MCS) of the uplink data according to the first transmission power, wherein the first transmission power is less than or equal to a second transmission power, and the second transmission power is a transmission power determined by the terminal device according to anti-interference capability of the terminal device.

The transceiving unit 320 is configured to send the uplink data to a network device according to the first MCS.

Optionally, the processing unit 310 is specifically configured to, before the first transmission power of the uplink data is determined, determine a third transmission power according to path loss information of the uplink data and/or power control information sent by the network device and/or scheduling information sent by the network device, wherein the power control information is used for indicating an adjustment amount of current uplink power of the terminal device; and determine the first transmission power by comparing the second transmission power with the third transmission power.

Optionally, the processing unit 310 is specifically configured to: determine the third transmission power as the first transmission power when the third transmission power is less than or equal to the second transmission power; or determine the second transmission power as the first transmission power when the third transmission power is greater than the second transmission power.

Optionally, the transceiving unit 320 is further configured to: before the first MCS of the uplink data is determined according to the first transmission power, receive the scheduling information sent by the network device, wherein the scheduling information includes configuration information of at least one demodulation reference signal (DMRS) and at least one MCS, and the at least one DMRS is used for indicating a value of at least one uplink power matched with the at least one MCS.

The processing unit 310 is specifically configured to: determine the first MCS according to the scheduling information and the first transmission power.

Optionally, the configuration information of the DMRS includes at least one of: configuration information of cyclic shift, configuration information of comb, and coding information.

Optionally, the scheduling information includes configuration information of a third DMRS and a third MCS, and the third DMRS is used for indicating that a transmission power matched with the third MCS is the third transmission power.

Optionally, the processing unit 310 is specifically configured to: determine the third MCS as the first MCS when the first transmission power is the third transmission power, or determine a second MCS as the first MCS when the first transmission power is the second transmission power. An order of the second MCS is lower than that of the third MCS.

Optionally, the scheduling information further includes configuration information of a second DMRS and a second MCS, and the second DMRS is used for indicating that a transmission power matched with the second MCS is the second transmission power.

Optionally, the first MCS is determined by the terminal device through a preconfigured relationship between the second MCS and the third MCS.

Optionally, the transceiving unit 320 is further configured to: send a preconfigured DMRS to the network device, wherein the preconfigured DMRS is used for notifying the network device that a transmission power used by the uplink data is the second transmission power.

Optionally, the transceiving unit 320 is further configured to: receive indication information sent by the network device, wherein the indication information is used for indicating the terminal device to repeatedly send the uplink data through multiple redundancy versions.

Optionally, the transceiving unit 320 is specifically configured to: receive downlink control information sent by the network device, wherein the downlink control information includes the indication information.

Figure 4:
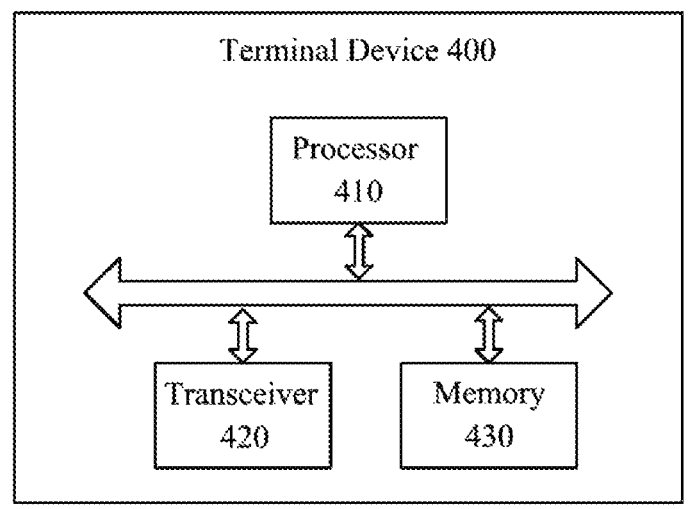
FIG. 4 is another schematic block diagram of a terminal device according to an implementation of the present disclosure.

It should be noted that the processing unit 310 may be implemented by a processor, and the transceiving unit 320 may be implemented by a transceiver. As shown in FIG. 4, a terminal device 400 may include a processor 410, a transceiver 420, and a memory 430. The memory 430 may be used for storing indication information, or may be used for storing codes, instructions, etc., executed by the processor 410. The various components in the terminal device 400 are connected by a bus system. The bus system includes a power bus, a control bus and a status signal bus in addition to a data bus.

The terminal device 400 shown in FIG. 4 can implement the various processes implemented by the terminal device in the method implementation of FIG. 2 to FIG. 4 described above. In order to avoid repetition, the details will not be repeated here.

Figure 5:
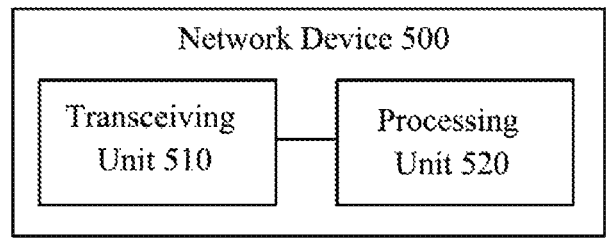
FIG. 5 is a schematic block diagram of a network device according to an implementation of the present disclosure.

FIG. 5 is a schematic diagram of a network device 500 according to an implementation of the present disclosure.

As shown in FIG. 5, the network device 500 includes a transceiving unit 510 and a processing unit 520.

The transceiving unit 510 is configured to receive uplink data sent by a terminal device.

The processing unit 520 is configured to determine a transmission mode of the uplink data, wherein transmission modes include a first mode and a second mode, the first mode refers to a mode in which the terminal device sends the uplink data according to a third transmission power, the second mode refers to a mode in which the terminal device sends the uplink data according to a second transmission power, the third transmission power is a transmission power controlled by the network device, and the second transmission power is a transmission power determined by the terminal device according to anti-interference capability of the terminal device.

Optionally, the transceiving unit 510 is further configured to: send scheduling information to the terminal device before the transmission mode of the uplink data is determined. The scheduling information includes configuration information of a third demodulation reference signal (DMRS) and a third modulation and coding scheme (MCS), and the third DMRS is used for indicating that a transmission power matched with the third MCS is the third transmission power.

The processing unit 520 is configured to: determine a second MCS according to the third MCS and a preconfigured relationship between the second MCS and the third MCS; demodulate the uplink data by using the third MCS and the second MCS; and determine that the transmission mode is the first mode when the data is successfully demodulated according to the third MCS, or determine that the transmission mode is the second mode when the network device successfully demodulates the data according to the second MCS.

Optionally, the processing unit 520 is further configured to: determine a first MCS of the uplink data according to the transmission mode. The transceiving unit 510 is further configured to demodulate the uplink data according to the first MCS.

Optionally, the transceiving unit 510 is further configured to: send scheduling information to the terminal device and determine a first DMRS of the uplink data before the transmission mode of the uplink data is determined. The scheduling information includes configuration information of at least one DMRS and at least one MCS, and the at least one DMRS is used for indicating a value of at least one uplink power matched with the at least one MCS. The processing unit 520 is specifically configured to: determine the transmission mode according to the first DMRS.

Optionally, the configuration information of the DMRS includes at least one of: configuration information of cyclic shift, configuration information of comb, and coding information.

Optionally, the scheduling information includes configuration information of a third DMRS and a third MCS, and the third DMRS is used for indicating that a transmission power matched with the third MCS is the third transmission power.

Optionally, the scheduling information further includes configuration information of a second DMRS and a second MCS, and the second DMRS is used for indicating that a transmission power matched with the second MCS is the second transmission power.

Optionally, the processing unit 520 is specifically configured to determine that the transmission mode is the first mode when it is determined that the first DMRS is the third DMRS, or determine that the transmission mode is the second mode when it is determined that the first DMRS is the second DMRS.

Optionally, the processing unit 520 is specifically configured to determine the third MCS as the first MCS when it is determined that the transmission mode is the first mode, or determine the second MCS as the first MCS when it is determined that the transmission mode is the second mode.

Optionally, the first DMRS is a preconfigured DMRS, and the preconfigured DMRS is used for notifying the network device that a transmission power used for the uplink data is the second transmission power. The processing unit 520 is specifically configured to determine that the transmission mode is the second mode.

Optionally, the first MCS is determined by the network device through a preconfigured relationship between the first MCS and the third MCS.

Optionally, the processing unit 520 is further configured to generate indication information when determining that the transmission mode is the second mode. The indication information is used for indicating the terminal device to repeatedly send the uplink data through multiple redundancy versions. The transceiving unit 510 is further configured to send the indication information to the terminal device.

Optionally, the transceiving unit 510 is specifically configured to send downlink control information to the terminal device, wherein the downlink control information includes the indication information.

Figure 6:
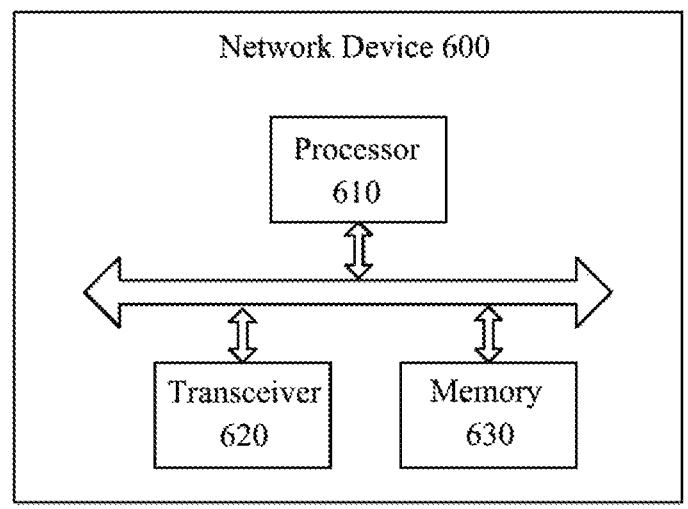
FIG. 6 is another schematic block diagram of a network device according to an implementation of the present disclosure.

It should be noted that the transceiving unit 510 may be implemented by a transceiver, and the processing unit 520 may be implemented by a processor. As shown in FIG. 6, a network device 600 may include a processor 610, a transceiver 620, and a memory 630. The memory 630 may be used for storing indication information, or may be used for storing codes, instructions, etc., executed by the processor 610. The various components in the network device 600 are connected by a bus system. The bus system includes a power bus, a control bus and a status signal bus in addition to a data bus.

The network device 600 shown in FIG. 6 can implement the various processes implemented by the network device in the method implementation of FIG. 2 to FIG. 4 described above. In order to avoid repetition, the details will not be repeated here. In other words, it should be noted that the method implementations in the implementations of the present disclosure may be applied to a processor or implemented by the processor.

In the implementation process, each act of the method implementations in the implementations of the present disclosure may be completed by an integrated logic circuit of hardware in the processor or an instruction in the form of software. More specifically, the acts of the method disclosed in connection with the implementations of the present disclosure may be directly embodied as completion through the execution of a hardware decoding processor or completion through the execution in the combination of hardware and software modules in the decoding processor. Software modules may be located in a typical storage medium in the art, such as, a random access memory (RAM), a flash memory, a read-only memory, a programmable read-only memory, an electrical erasable programmable memory, or a register. The storage medium is located in the memory, and the processor reads the information in the memory and completes the actions of the above method in combination with its hardware.

Herein, the processor may be an integrated circuit chip with a capability for processing signals, and may implement various methods, acts and logic block diagrams disclosed in the implementations of the present disclosure. For example, the above processor may be a general purpose processor, a digital signal processor (DSP), an application specific integrated circuit (ASIC), a field programmable gate array (FPGA) or other programmable logic devices, a transistor logic device, or a discrete hardware component, or the like. Furthermore, the general purpose processor may be a microprocessor or the processor may be any conventional processor or the like.

In addition, the memory in implementations of the present disclosure may be a transitory memory or a non-transitory memory, or may include both the transitory memory and the non-transitory memory. The non-transitory memory may be a read-only memory (ROM), a programmable ROM (PROM), an erasable PROM (EPROM), an electrically erasable EPROM (EEPROM), or a flash memory. The transitory memory may be a Random Access Memory (RAM) which serves as an external cache. It should be understood that, the foregoing memory is an example for illustration and should not be construed as limiting. For example, optionally, the memory in the implementations of the present disclosure may be a Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), Direct Rambus RAM (DR RAM), or the like. That is, memories in the systems and methods described herein are intended to include, but are not limited to, these and any other suitable types of memories.

Finally, it should be noted that the terms used in the implementations of the present disclosure and the appended claims are for the purpose of describing specific implementations only and are not intended to limit the implementations of the present disclosure.

For example, the singular forms "a/an", "said", and "the" used in the implementations of the present disclosure and the appended claims are also intended to include the plural forms unless the context clearly indicates other meanings.

For another example, terms "first terminal device" and "second terminal device" may be used in an implementation of the present disclosure, but these terminal devices should not be limited to these terms. These terms are only used to distinguish the types of cell groups from each other.

For another example, depending on the context, the word "when" as used herein may be interpreted as "if" or "whether" or "while" or "in response to a determination of/that" or "in response to a detection of/that". Similarly, depending on the context, the phrase "if determined" or "if detected (a stated condition or event)" may be interpreted as "when . . . is determined" or "in response to a determination" or "when (stated condition or event) is detected" or "in response to a detection of (stated condition or event)".

Those of ordinary skill in the art will recognize that various example units and algorithm acts described in connection with the implementations disclosed herein can be implemented in electronic hardware, or a combination of computer software and electronic hardware. Whether these functions are implemented in hardware or software depends on a specific application and design constraint of the technical solutions. One skilled in the art may use different methods to implement the described functions for each particular application, but such implementation should not be considered to be beyond the scope of implementations of the present disclosure.

Those skilled in the art may clearly understand that for convenience and conciseness of description, the specific working processes of the systems, apparatuses and units described above may refer to the corresponding processes in the aforementioned method implementations, and details are not described herein again.

In several implementations provided by the present disclosure, it should be understood that the disclosed systems, devices and methods may be implemented in other ways. For example, the device implementations described above are only illustrative, for example, the division of the units is only a logical function division, and there may be other division modes in actual implementation, for example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The units described as separated components may or may not be physically separated, and the component shown as a unit may or may not be a physical unit, i.e., it may be located in one place or may be allocated over multiple network units. Parts or all of the units can be selected according to actual needs to achieve the purpose of the implementations of the present disclosure.

In addition, various functional units in the implementations of the present disclosure may be integrated in one processing unit, or various units may be presented separately in a physical way, or two or more units may be integrated in one unit.

The function units may be stored in a computer readable storage medium if realized in a form of software functional units and sold or used as a separate product. Based on this understanding, the technical solutions of the implementations of the present disclosure, in essence, or the part contributing to the related art, or the part of the technical solutions, may be embodied in the form of a software product stored in a storage medium, including several instructions for causing a computer device (which may be a personal computer, a server, or a network device, etc.) to perform all or parts of the acts of the methods described in various implementations of the present disclosure. The aforementioned storage medium includes a medium capable of storing program codes, such as, a U disk, a mobile hard disk, a read-only memory (ROM), a magnetic disk or an optical disk, etc.

What are described above are merely the specific implementations of the implementations of the present disclosure, but the protection scope of the implementations of the present disclosure is not limited thereto. Any change or substation that can be easily conceived by a person skilled in the art within the technical scope disclosed by the implementations of the present disclosure shall be included within the protection scope of the implementations of the present disclosure. Therefore, the scope of protection of the implementations of the present disclosure should be subject to the scope of protection of the claims.

What we claim is:

1. A data transmission method, comprising:
   determining, by a terminal device, a first transmission power of uplink data, wherein the first transmission power is less than or equal to a second transmission power, and the second transmission power is a transmission power determined by the terminal device according to anti-interference capability of the terminal device;
   determining, by the terminal device, a first modulation and coding scheme (MCS) of the uplink data according to the first transmission power; and
   sending, by the terminal device, the uplink data to a network device according to the first MCS,
   wherein before the terminal device determines the first transmission power of the uplink data, the method further comprises:
   determining, by the terminal device, a third transmission power according to at least one of path loss information of the uplink data, power control information sent by the network device, or scheduling information sent by the network device, wherein the power control information is used for indicating an adjustment amount of current uplink power of the terminal device;
   wherein determining, by the terminal device, the first transmission power of the uplink data, comprises:
   determining, by the terminal device, the first transmission power by comparing the second transmission power with the third transmission power.

2. The method according to claim 1, wherein determining, by the terminal device, the first transmission power by comparing the second transmission power with the third transmission power, comprises:
  determining, by the terminal device, the third transmission power as the first transmission power when the third transmission power is less than or equal to the second transmission power; or
  determining, by the terminal device, the second transmission power as the first transmission power when the third transmission power is greater than the second transmission power.

3. The method according to claim 1, wherein the method further comprises:
  before the terminal device determines the first MCS of the uplink data according to the first transmission power, receiving, by the terminal device, the scheduling information sent by the network device, wherein the scheduling information comprises configuration information of at least one demodulation reference signal (DMRS) and at least one MCS, and the at least one DMRS is used for indicating a value of at least one uplink power matched with the at least one MCS;
  wherein determining, by the terminal device, the first MCS of the uplink data according to the first transmission power, comprises:
  determining, by the terminal device, the first MCS according to the scheduling information and the first transmission power.

4. The method according to claim 3, wherein the configuration information of the DMRS comprises at least one of:
  configuration information of cyclic shift, configuration information of comb, or coding information.

5. The method according to claim 3, wherein the scheduling information comprises configuration information of a third DMRS and a third MCS, and the third DMRS is used for indicating that a transmission power matched with the third MCS is the third transmission power.

6. The method according to claim 5, wherein determining, by the terminal device, the first MCS according to the scheduling information and the first transmission power, comprises:
  when the first transmission power is the third transmission power, determining, by the terminal device, the third MCS as the first MCS; or
  when the first transmission power is the second transmission power, determining, by the terminal device, a second MCS as the first MCS, wherein an order of the second MCS is lower than an order of the third MCS.

7. The method according to claim 6, wherein the scheduling information further comprises configuration information of a second DMRS and the second MCS, and the second DMRS is used for indicating that a transmission power matched with the second MCS is the second transmission power.

8. The method according to claim 6, wherein the first MCS is determined by the terminal device through a preconfigured relationship between the second MCS and the third MCS.

9. The method according to claim 8, wherein the method further comprises:
  sending, by the terminal device, a preconfigured DMRS to the network device, wherein the preconfigured DMRS is used for notifying the network device that a transmission power used for the uplink data is the second transmission power.

10. A terminal device, comprising:
  a processor, configured to determine a first transmission power of uplink data wherein the first transmission power is less than or equal to a second transmission power, and the second transmission power is a transmission power determined by the terminal device according to anti-interference capability of the terminal device; and determine a first modulation and coding scheme (MCS) of the uplink data according to the first transmission power; and
  a transceiver, configured to send the uplink data to a network device according to the first MCS,
  wherein the processor is specifically configured to:
  before the first transmission power for the uplink data is determined, determine a third transmission power according to at least one of path loss information of the uplink data, or power control information sent by the network device, or scheduling information sent by the network device, wherein the power control information is used for indicating an adjustment amount of current uplink power of the terminal device; and determine the first transmission power by comparing the second transmission power with the third transmission power.

11. The terminal device according to claim 10, wherein the processor is specifically configured to:
  determine the third transmission power as the first transmission power when the third transmission power is less than or equal to the second transmission power; or
  determine the second transmission power as the first transmission power when the third transmission power is greater than the second transmission power.

12. The terminal device according to claim 10, wherein the transceiver is further configured to:
  receive the scheduling information sent by the network device before the first MCS of the uplink data is determined according to the first transmission power, wherein the scheduling information comprises configuration information of at least one demodulation reference signal (DMRS) and at least one MCS, and the at least one DMRS is used for indicating a value of at least one uplink power matched with the at least one MCS;
  wherein the processor is specifically configured to:
  determine the first MCS according to the scheduling information and the first transmission power.

13. The terminal device according to claim 12, wherein the configuration information of the DMRS comprises at least one of:
  configuration information of cyclic shift, configuration information of comb, or coding information.

14. The terminal device according to claim 12, wherein the scheduling information comprises configuration information of a third DMRS and a third MCS, and the third DMRS is used for indicating that a transmission power matched with the third MCS is the third transmission power.

15. The terminal device according to claim 14, wherein the processor is specifically configured to:
  determine the third MCS as the first MCS when the first transmission power is the third transmission power; or
  determine a second MCS as the first MCS when the first transmission power is the second transmission power, wherein an order of the second MCS is lower than an order of the third MCS.

16. The terminal device according to claim 15, wherein the scheduling information further comprises configuration information of a second DMRS and the second MCS, and the second DMRS is used for indicating that a transmission power matched with the second MCS is the second transmission power.

17. The terminal device according to claim 10, wherein the transceiver is further configured to:
   receive indication information sent by the network device, wherein the indication information is used for indicating the terminal device to repeatedly send the uplink data through a plurality of redundancy versions.

18. The terminal device according to claim 17, wherein the transceiver is specifically configured to:
   receive downlink control information sent by the network device, wherein the downlink control information comprises the indication information.

\* \* \* \* \*